Sept. 29, 1953 A. S. TITCOMB Re. 23,717

ABRASIVE BLOCK OR SEGMENT

Original Filed June 1, 1949 5 Sheets-Sheet 1

INVENTOR.
Albert Shepard Titcomb
BY
Barlow & Barlow
ATTORNEYS.

ABRASIVE BLOCK OR SEGMENT
Original Filed June 1, 1949 5 Sheets-Sheet 2
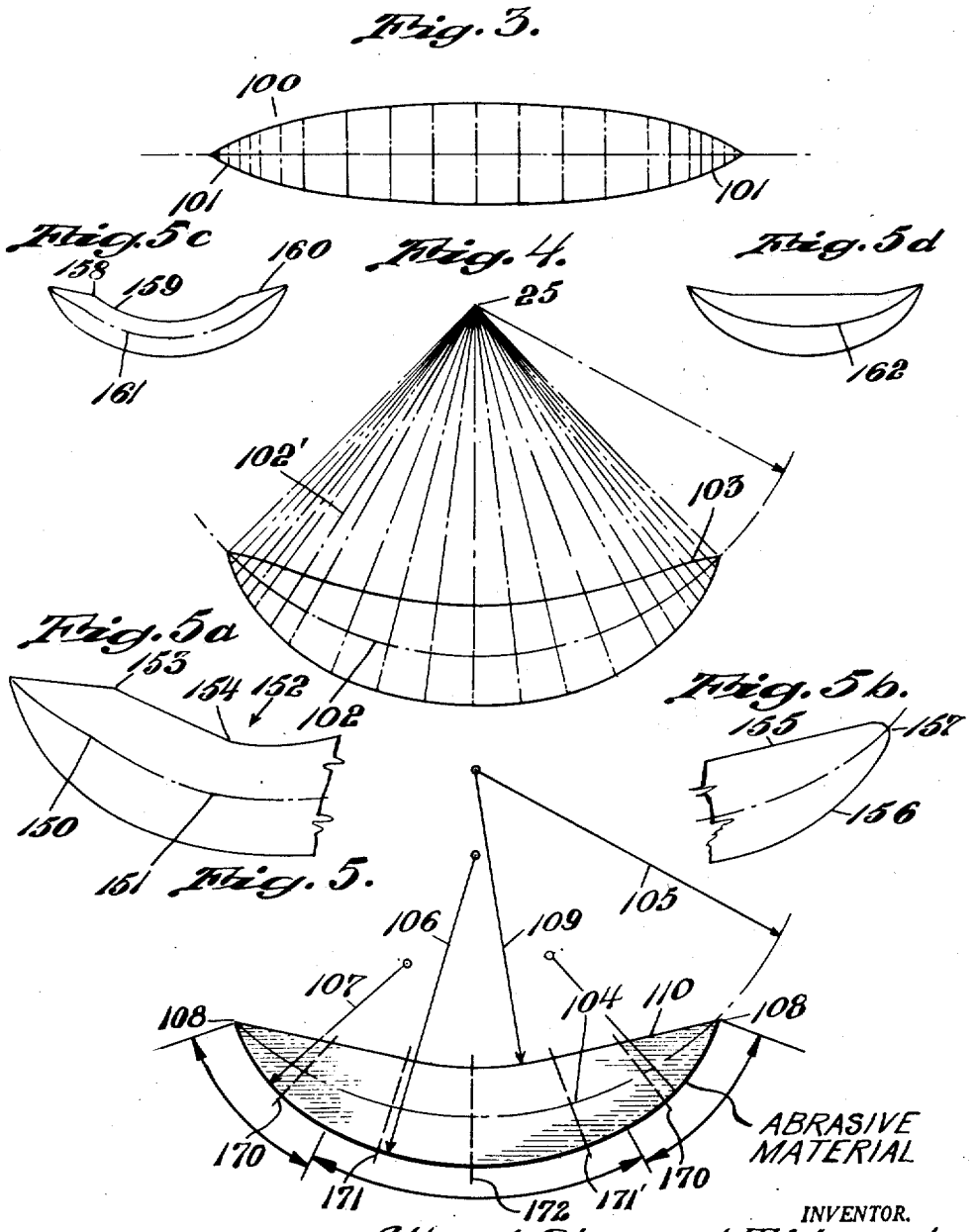
INVENTOR.
Albert Shepard Titcomb
BY
Barlow & Barlow
ATTORNEYS.

ABRASIVE BLOCK OR SEGMENT

Original Filed June 1, 1949 5 Sheets-Sheet 3

INVENTOR,
Albert Shepard Titcomb
BY
Barlow & Barlow
ATTORNEYS.

ABRASIVE BLOCK OR SEGMENT

Original Filed June 1, 1949 5 Sheets-Sheet 4

INVENTOR.
Albert Shepard Titcomb
BY
Barlow & Barlow
ATTORNEYS.

ABRASIVE BLOCK OR SEGMENT

Original Filed June 1, 1949 5 Sheets-Sheet 5

INVENTOR.
Albert Shepard Titcomb
BY
Barlow & Barlow
ATTORNEYS.

Reissued Sept. 29, 1953 Re. 23,717

UNITED STATES PATENT OFFICE 23,717

ABRASIVE BLOCK OR SEGMENT

Albert Shepard Titcomb, Hamden, Conn.

Original No. 2,501,422, dated March 21, 1950, Serial No. 96,476, June 1, 1949. Reissue No. 23,364, dated May 8, 1951, Serial No. 193,231, October 31, 1950. Reissue No. 23,558, dated September 30, 1952, Serial No. 275,178, March 6, 1952. This application for reissue May 7, 1953, Serial No. 353,707

23 Claims. (Cl. 51—209)

This invention relates to an abrasive grinding wheel which is composed of a plurality of spaced abrasive surfaces, and more particularly to the abrasive block or segment which is utilized for such a wheel. This application is a continuation-in-part of my co-pending application Serial No. 679,807, issued July 19, 1949, Patent Number 2,476,334, which claims more particularly the wheel as a whole, while this application is directed specifically to the segment or block per se which goes into such wheel.

Abrasive grinding wheels of the above character have heretofore been constructed of a grinding segment composed of abrasive material shaped like a hollow cylinder, known in the trade as an "inverted cup." The sides of the cup are often made of segments each locking into the next segment. This and all such segments are possessed of convex or concave blunt ends.

Sometimes the sides of the cup are made of segments with spaces in between the segments, and these are held by a locking device which retains the sides of the cup to an upper base by means of what is known in the trade as a chuck, and such segments are also usually formed with blunt ends as hereinafter described.

Still another style of segment is so constructed and spaced in a chuck that it will conform to the circular outer surface of a cup wheel while the inner surface of each segment is flat and the complete wheel, due to the several flat inner surfaces of the segments assumes a prismatic inner form.

Such segments are generally considered by the trade and by me to have sharp ends, and they are, as we use the term, sharp ends. In actual practice they are not, as we use the term hereinafter explained, full sharp ends, since these otherwise full sharp ends are modified at the tips by a cut at right angles to the flat inner surface, thus decreasing fragility and assuring proper fit in the chuck that is made to hold them. Any such wheel is intended for operating on a mounting at the bottom of a rotating vertical spindle on work fastened to a movable base (either rotary or reciprocative) and where the revolving segments are pressed downward against the work. It is also intended for operating on a mounting at one end of a horizontal spindle on work fastened to a reciprocating table so that the revolving segments are pressed against the work. When the wheel is applied to the work, chips of the work and also of the cutting wheel are formed by removal of the stock of each. This removed stock will load up or interfere with the efficient cutting action of the usual types of wheels, the cutting efficiency of a wheel depending to a substantial extent upon the elimination or removal of this debris. Thus, the particular shape of the block and arrangement of the several blocks in the wheel are therefore very important from the standpoint of an efficient cutting wheel. It has been found that if this loose stock is readily removed from the grinding before it becomes embedded into the cutting surface of the wheel or segment, it is unnecessary to dress the wheel as frequently as otherwise and even often eliminates such dressing entirely. This is because the loose stock fills in the crevices, that is, loads the wheel so that the cutting edges of the rough surface are neutralized and forms a smooth uncutting wheel which causes heating, burning, and warpage of the work being ground. This friction instead of cutting action often causes sufficient friction to throw the work off the magnetic chuck, generally used, sometimes with serious results.

One of the objects of this invention is to provide a block for an abrasive grinding wheel, which block will be of such shape that it will provide a more efficient and freer cutting wheel action than other segmental block wheels have heretofore accomplished.

Another object of this invention is to provide a shape of abrasive block so that chips will be self-removed efficiently and thus prevent loading of the wheel.

Another object of this invention is to provide an abrasive block which will cause its leading edge to have an efficient plow action upon the chips which are formed to spread the chips outwardly and inwardly of the block, maintaining clean, the cutting surface of the block as it advances.

Another object of this invention is to provide an abrasive block which, when in a wheel, will run cool and free of loading and thus prevent heating and warping of the work.

Another object of this invention is to provide an abrasive block which will be of such form that it may be utilized in a plurality of different diameter wheels, thus enabling lower cost to manufacture through this standardization by necessitating the use of only a single mold in connection with the manufacture, and only a single style of segment in inventory for servicing and supplying such a wide variety of diameters and types of chucks for the many sizes and makes of grinders.

With these and other objects in view, the invention consists of certain novel features of construction, as will be more fully described and particularly pointed out in the appended claims.

In the accompanying drawings:

Figure 1 is a perspective view of an abrasive block formed in accordance with this invention;

Figure 2 is a plan view of several of the abrasive blocks arranged in the form which they will assume in a grinding wheel utilizing abrasive blocks of this shape; also shown is the path of the work obliquely across the face of the segment as it rotates about the center with the chips for the greater part coming off the inner side of the segmnt and being forcibly struck by the outer side of the succeeding segment, thus plowed outwardly and disposed of.

Figure 3 is a diagrammatic view of the basic form of a segment or block having rather ideal plow-like properties when in action if the same were drawn in a straight line;

Figure 4 is a view similar to Figure 3, but illustrating the segment as being developed into an arcuate form or shape desirable for grinding wheel purposes;

Figure 5 is a plan view of a block illustrating a modified shape so far as Figure 4 is concerned, but showing diagrammatically by means of radius lines one shaping of the block for manufacturing purposes.

Figure 5–*a* is a plan view and is an exact copy of the shape of the segment as shown in Figure 4 of U. S. Patent No. 2,476,334, of which this application is a continuation-in-part case, and illustrates the end of a segment wherein the inner contour is subject to abrupt changes in direction, thus causing the segment to have an angular median.

Figure 5–*b* is a plan view and illustrates the right end of a segment identically like Figure 5 except that it is in line with actual manufacturing practice. The substantial portion of each of the converging sides of the end of the segment are identical with those of Figure 5, except that the tip of this segment shows an arc of substantial size which may or may not be of regular contour (in fact more often not) in that these segments are made of abrasive material.

Figure 5–*c* is a plan view and illustrates a figure identical to Figure 5 except that, as in Figure 5–*a*, an abrupt change in the inner contour occurs where a curve of lesser radius causes the segment to be of thinner construction, thus effectively reducing the area and producing a softer grinding action with a given grade of specification.

Figure 15:
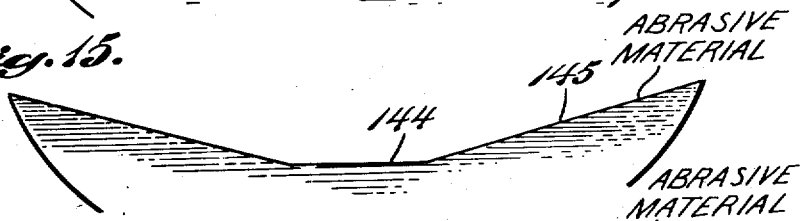
Figure 16:
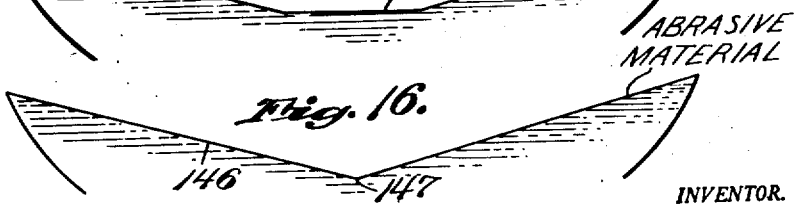

Figure 5–*d* is a plan view and illustrates a figure identical to Figure 5 but similar to Figure 15 herein, except that this causes the segment to be of heavier construction, thus effectively increasing the area and producing a harder grinding action with a given grade of specification.

Figure 6:
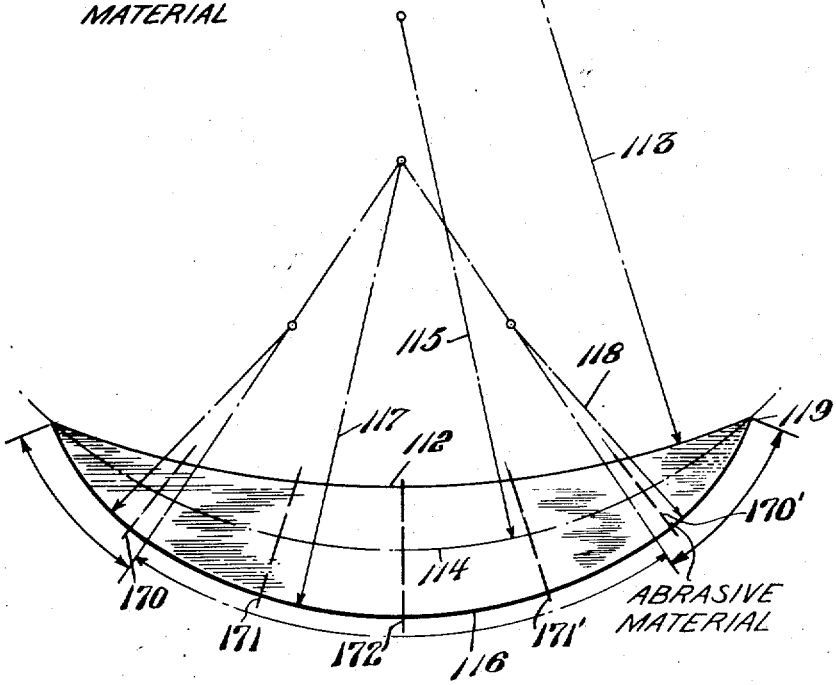
Figure 7:
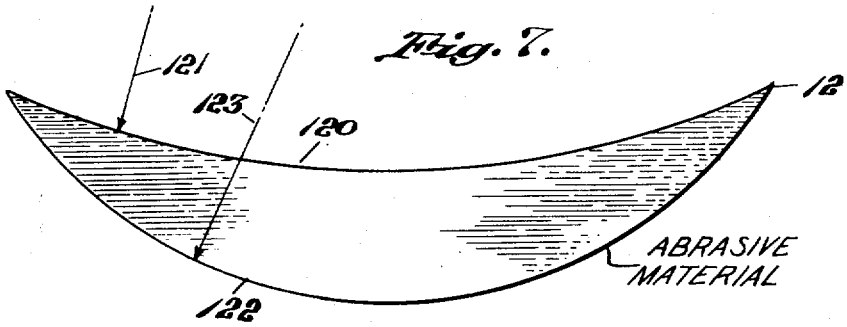

Figure 6 is a diagrammatic view illustrating a further modification showing the arcuate lines forming the edges of the block and their radius lines where true arcs go to make up the segment formed;

Figure 7 is a diagrammatic view illustrating a segment formed from two arcs;

Figures 8, 9, 10, 11, and 12 are diagrammatic views each showing an inner edge of any suitable arcuate form while the outer surface of the segment is formed arcuate each of different form by different formations of the surface;

Figures 13 to 16 are diagrammatic views illustrating segments each of modified form and showing the inner surfaces of the segments each different but formed from flat and curved surfaces of varying form although generally of the same characteristics; while the outer surface of the segment is of any suitable arcuate form.

Figure 1:
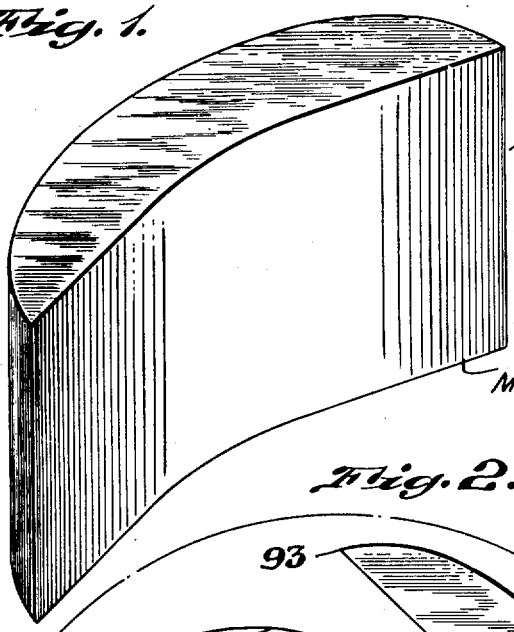
Figure 17:
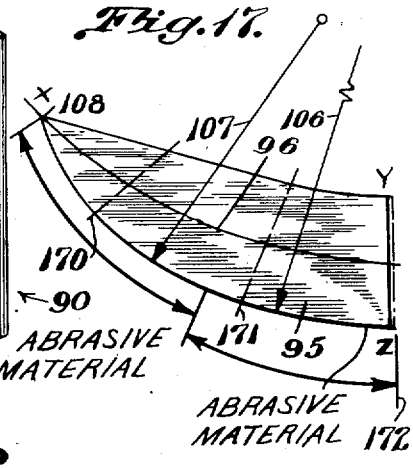

Figure 17 illustrates a segment which is substantially one-half of the segment shown in Figure 1, the outer surface X—Z being of longer extent than the inner surface X—Y.

Figure 18:
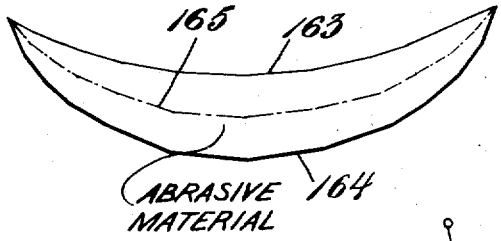

Figure 18 is a plan view and illustrates a segment, in which both the inner and outer arcuate surfaces are made up of a series of plane surfaces, each substantially flat or only slightly arcuate, and set at obtuse angles one to another. Also shown is the resultant angularly arcuate median.

Figure 19:
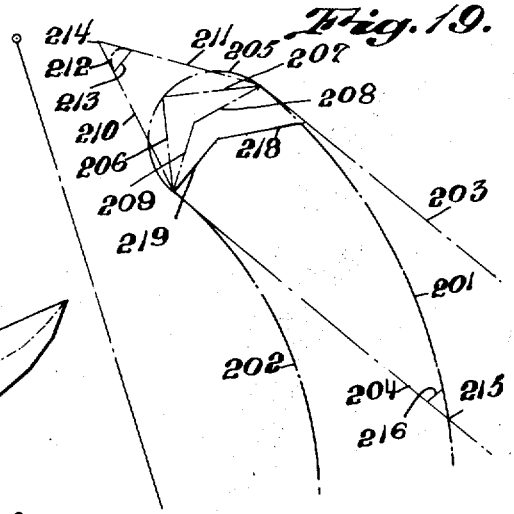

Figure 19 is a diagrammatic view illustrating the meaning of certain definitions, or terms used in this specification and includes diagrammatic material of prior art for reference thereto.

In proceeding with this invention, I have constructed an abrasive block or segment of an elongated shape which will have substantially pointed ends. The leading pointed end will be so positioned in the wheel that the opposite flaring edges from the leading end will have a plow action upon the chips and debris ground off by the preceding segment or segments. The greater part of this action is accomplished by the outer side, for as the work crosses the segment obliquely, most chips come off the inner edge of the cutting surface, mix with the coolant, and are struck by the outside of the succeeding segment, thus said outer side forces these chips outwardly by physical displacement (plowing action) plus centrifugal force.

These blocks are all of the same size and shape for standardization and for grinding wheels of different diameters, and I usually mount more upon a larger wheel than on a smaller wheel in order to provide the size of grinding wheel desired. The blocks may also be arranged in overlapping circular echelon relation so that a continuous cutting surface is provided on the work, thus preventing the opportunity for the stock being ground to rise, and at the same time providing necessary chip clearance between blocks or segments. The overlapping relation will be so spaced that the chips removed from the work may be thrown aside from wheel by centrifugal force as well as by physical displacement of the plow action referred to above. Coolant is usually delivered at a location just inwardly of the circular cutting annulus of the wheel and flows to the work surface within this annulus. For greater detail concerning the wheel itself, reference is made to the above-mentioned copending application (U. S. Patent No. 2,476,334).

By the general term "arcuate" I mean an arc or a line which may be shaped like the bow of a bow and arrow and formed of portions of several true arcs struck from centers or a line which may be formed of flat surfaces at obtuse angles to each other and polygonal in plan or a line made up of arcs and flat surfaces generally in the form of the median line or either edge depicted in the various views.

Figure 10:
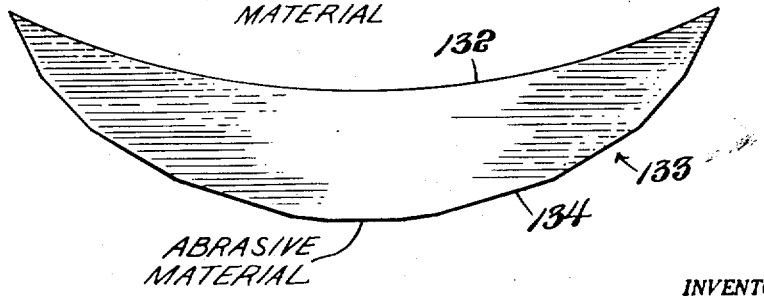
Figure 11:
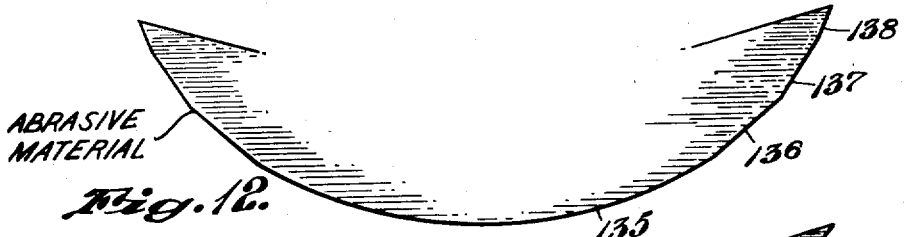
Figure 12:
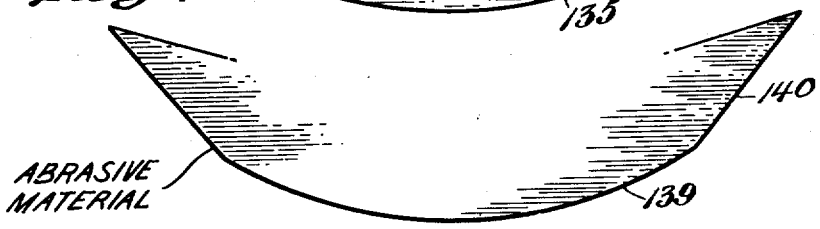

By the specific term "angularly arcuate" I mean specifically a line which is shaped, taken as a whole over its length, like the bow of a bow and arrow, and formed of flat surfaces, joining at obtuse angles to each other of non-blending contour and polygonal in plan, or a line formed by arcs or arcuate and flat surfaces joining at obtuse angles to each other of non-blending contour, generally in the form shown by the outer edge depicted in Figures 10, 11, and 12, and on the inner edge as depicted in Figures 5–*a*, 5–*c*, and 5–*d*, 14, 15, 16, or both edges and the median in the Figure 18.

By the specific term "non-angularly arcuate," I mean a line which is shaped like the bow of a bow and arrow, and formed by portions of several true arcs struck from centers or formed by arcs or arcuate and flat surfaces, all such arcs or arcuate surfaces joined with flat surfaces blending tangentially to form a smooth, unbroken continuity as depicted by either edge or the median in Figures 1, 2, 3, 4, 5, 5–*b*, 6, 7, and 17, or the outer edge of Figures 5–*a*, 5–*c* and 5–*d*.

It is here recognized that any figure, to have a non-angular median must have both of its sides of non-angular form. One side of angular form will cause an angular median which will average in the extent of its angularity between the angle of the angular side and the side of smooth non-angular contour.

By the term "blunt end," I mean the end formed on the extremity of two relatively long parallel surfaces, as Fig. 19, 203 and 204; or an end formed on two concentric surfaces as 201 and 202, as a portion of a cylinder; or an end formed on the outer extremity of two diverging surfaces of a solid object, said ends being bounded either by a semi-circle, as 205, or any chords of a semi-circle, as 206 and 207, from a point along said semi-circle to said surfaces.

By the term "sharp end," I mean the approach, one toward another, of two converging surfaces as 210 and 211, of substantial length with relation to full size of the object, regardless of whether the tip may be an arc substantially blending into the two said converging-surfaces, as 212, or a flattened tip as 213, or any other formation of structure, as of abrasive material, convenient and practical for manufacture, causing said terminating end surface.

It is here recognized that theoretically, the sharpest end is formed by the intersection of two surfaces that are just off of parallel. For the purpose of this patent, the opposite extreme of sharpness toward bluntness shall be considered the joining by any method of the two converging surfaces of substantial relative length, the included angle through which would be less than 90°. See Figure 19, 210 and 211, compared with 206 and 207.

By the term "full sharp end," in contra-distinction to the above definition of sharp end, I mean to indicate the full continuation of each surface to the theoretical point of intersection 214, and as shown in all of my figures, with the single exception of Figure 5–*b*, which compares with 212, as I prefer them so made because of the functional advantage of the sharpest possible point giving the best plowing or spreading effect on chips removed by preceding segments rather than that said chips should be allowed to pass under the segment, loading up its otherwise free cutting surface as happens in the case with more rounded or blunt ended segments at the high surface feet per minute speeds that are standard practice on this form of grinding.

The fact is, that "blunt," "sharp," and "full sharp" are relative terms, and are necessarily limited by the application of the product. With any mechanical cutting device the sharpest edges under sufficient magnification show definite roundnesss.

As used in my claims the term "sharp" is used essentially to differentiate between the converging, acutely angled, sides forming the ends of my segments and the concentric non-converging inside and outside full length surfaces, or sides, of other shapes of segments, including in particular that type upon which an arc of substantially full semi-circular character forms an end, as 205 on 201 and 202, considered by me, and, as would be defined above, as a "blunt end." In contrast, the converging ends of my segments form what I consider a "sharp end," looking at the segment as a whole, regardless of the actual condition of the tip, where an arc, joining the converging sides of my segments, tangentially, would always form only a portion of and definitely less than a full semi-circle. Therefore, the joining in any manner convenient for manufacture of the converging sides of my segments, as with other typical segments, as one formed by 201 and 204 theoretically ending in 215, but actually as manufactured ending at 216, and thus comes under the meaning of "sharp ends."

In Figure 19 I have shown the ends of some forms of hypothetical segments for the purpose of defining exactly what I mean by the terms "blunt end," "sharp end," and "full sharp end."

Lines 201 and 202, which may be concentric arcs or straight surfaces, as 203 and 204, extending parallel to each other, illustrate the side-edge surfaces of the center portion of a body, typical of a segment.

When said side edge surfaces are tangentially joined to each other by a semi-circular arc 205, an end is formed which I consider to be a "blunt end."

When said side edge surfaces are joined by any two straight converging end surfaces, as 206 and 207, which are based at the ends of the semi-circle 205 and which, if converged to their apex—said apex meeting on the semi-circle 205—such converging ends would approach one another at an included angle, which must necessarily be 90°, which I consider to be a "blunt end."

When said side edge surfaces are joined to each other by any end surfaces as 208 and 209, which would be contained within the semi-circle, they form a greater obtuse included angle condition than the 90° condition described above, which I also consider to be a "blunt end."

When said side edge surfaces are joined by surfaces similar to end surfaces 208 and 209, by slightly changing the relative position, hinging at the inner side, so that 209 comes to a radial position relative to the wheel as a whole, becoming as 219, while 208 becomes as 218, said type of segment also possesses what I consider to be a "blunt end."

When said side edge surfaces are joined to each other by any end surfaces of substantial extent as 210 and 211, which if converged to their apex would meet outside the semi-circle 205, such converging end surfaces will make an acute angle condition rather than the 90° condition described above and would therefore provide what I consider a "sharp end" regardless of the extreme tip shape thereof, whether said tip shape be blunted at said extreme tip portion as 212, 216, or 213 or otherwise, or continue to their theoretical intersection as at 214 or 215 to form what I refer to as a "full sharp end."

In Figure 19, when one end of a segment is formed as having the outer surface 201, the inner surface 204, said segment while theoretically ending in point 215 is actually modified in practice by 216, forming at 216 what is termed here a "sharp end."

An arcuate surface of greater radius means nearer a flat surface and of lesser radius would mean further from a flat surface.

Figure 2:
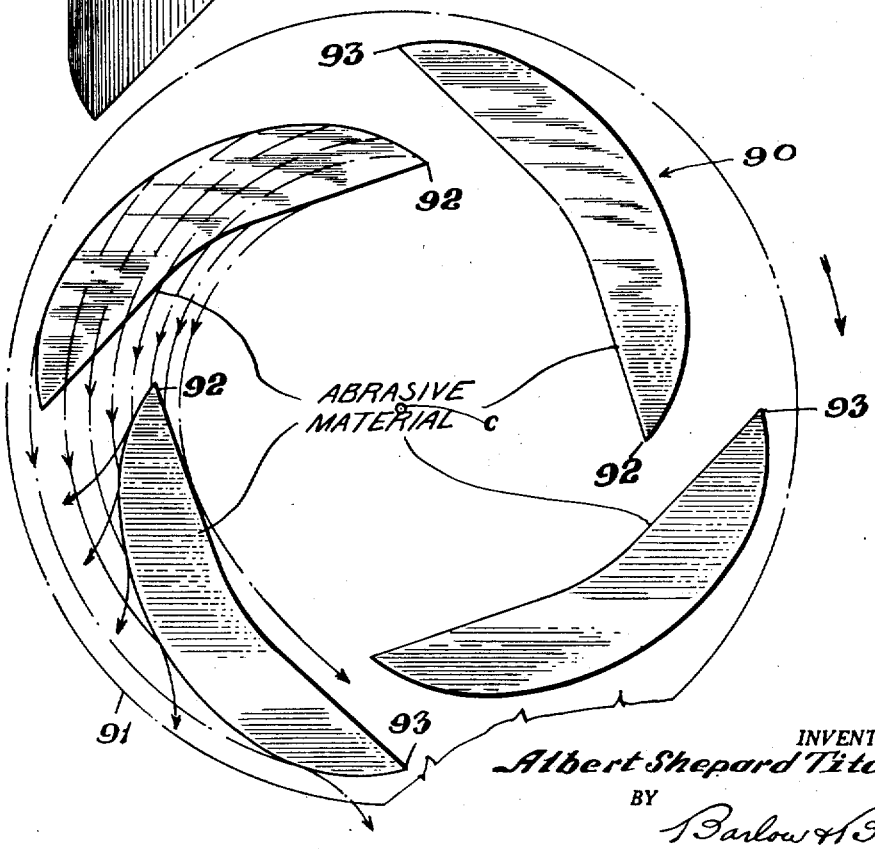

With reference to the drawings, Figure 1 shows a perspective view of the shape of an abrasive block or segment 90 of a commercial form which is the subject of this invention. Pads of gasket material as glued to the land or bearing positions that are standard equipment on the completed block as supplied to the trade are not shown on any of these drawings but are shown in the original patent U. S. No. 2,476,334 of which this patent is a reissue of a continuation-in-part case. Four of such blocks are shown in Figure 2 in the arrangement which will occur when assembled as an abrasive wheel indicated by dot and dash lines 91. In each case the leading end 92 of the block will be nearer the center of the wheel than the trailing end 93 so as to arrange the blocks in a circular echelon relation with the leading end of one block usually overlapping the trailing end of the next block so that engagement with the work may be continuous.

Figure 2 also illustrates the path of the work with respect to the center C of rotation of the wheel, clearly indicating the oblique passage of such work across the face of my segments when in position in my chuck. The path of debris or chips will be traced to the inner edge of the cutting segment for the most part, whence it passes from this inner edge, mixes with the coolant, if any, and is struck by the outer edge of the succeeding segment, thus being plowed away. At this point, also, centrifugal force comes into play and has the very desirable effect of maintaining clean the outer plowing surface of my segments.

In Figure 3 I have illustrated at 100 a fundamental form of abrasive block which will have pointed ends 101 formed by reducing the thickness from the extreme width along a substantial length. As most grinding wheels are formed in circular shape, the abrasive block which will be used will be of arcuate shape and will be developed from the fundamental form shown in Figure 3 by determination of the general curvature of the block desired which may be the median line or center line of the block 102 from which the shape is developed. Figure 4 designates such median line with the opposite edges laid off on either side of the median line as equal dimensions along radii 102' from the center of the median line, or if this median line is not a true arc having a center but is rather arcuate in form, the layout will be along lines at right angles to the portion of the arcuate line at different points along its length. In Figure 4 the inside arcuate edge of the block is shown to have a reverse curve 103 as it approaches the median line to form an acutely angled end.

A form which is found to be suitable is shown in Figure 5 where the median 104 is formed on the arc of a circle having a radius 105, while the inner and outer surfaces of the block are arcuate, the outer surface having a center arc from radius 106 with arcs from shorter radii as at each end such as 107 joining the center arc to the median at 108. This forming of an arc merging into an arc of shorter radius has the desired effect of producing a block of not too great thickness or too great length yet having sufficiently stubby and strong portions near its extremities to safely bear the strain of service without breakage. The inner surface of the block is also arcuate having a center arcuate surface from radius 109 which is connected by flat plane surfaces forming flat lands or bearing areas such as 110 to the substantially full sharp ends 108 which are on the median. These flat lands are so designed and placed with relation to the curved lands on the outer surface as to properly receive the stress of the similarly formed clamping areas of the clamp bodies of the chuck. Standard practice includes the use of pads of gasket material at all land or bearing positions as 110, 155, 156, 153, 158, 128, 137, 142. A perspective view of the block so formed is shown in Figure 1. In each case, however, acutely angled ends are provided, full sharp ends being generally shown, as nearly such full sharp ends as possible will secure maximum performance through obtaining the maximum plowing action.

In Figure 5–*a* I have shown an exact copy of the shape of the segment as shown in Figure 4 of the U. S. Patent No. 2,476,334, of which this patent is a continuation-in-part. Here the median will be seen to have an angular break as at 150 and 151, inherent therein due to the abrupt change in the direction of the inner edge from 152 as at 153 and 154. This is inherent in the structure.

In Figure 5–*b* I have shown the right end of a segment identically like Figure 5, except that it is in line with actual manufacturing practice. The substantial portion of each of the converging sides 155 and 156 of the end of the segment are identical with those of Figure 5, except that the tip 157 of this segment shows an arc of substantial size which may or may not be of regular contour, in fact more often not, in that these segments are made of abrasive material which is of rough character. This cannot help but occur in varying degree in actual manufacturing practice.

In Figure 5–*c* I have shown a figure identical to Figure 5 as far as the important bearing or land areas used in actual manufacture are concerned, but, as in Figure 5–*a* an abrupt change of the inner contour occurs at 158 where a curve of lesser radius 159 at the inner center joins the flat inner land end portion 160, thus effectively reducing the area in the same manner as would be standard practice for ring-wheel operation, in that the cutting edge of the wheel is thinned down. The resultant angularly arcuate median line 161 is also shown.

In Figure 5–*d* I have shown a figure identical to Figure 5 as far as the important bearing or land areas used in actual manufacture are concerned, but, here I have in effect a repetition of a practical application of our Figure 15 herein, thus having the exact opposite effect to Figure 5–*c* in that it increases, rather than decreases, to the desired extent, the area of the segment grinding on the work. Median line 162 is included.

In some cases, as shown in Figure 6, there may be a single inner arc for the inner surface of the block which is designated 112 and struck from the radius 113, while the median line may be an arc 114 having radius 115 with the outer surface 116 arcuate and formed from arcs having radii 117 and other radii 118 of shorter radius at the ends, thus forming acutely angled ends 119. In some cases I may provide a segment formed of two arcs, as shown in Figure 7, there being an inner arc 120 formed on radii 121 and an outer arc 122 formed on radii 123, thus also providing acutely angled ends 124 but of a much thinner and more fragile character.

Figure 8:
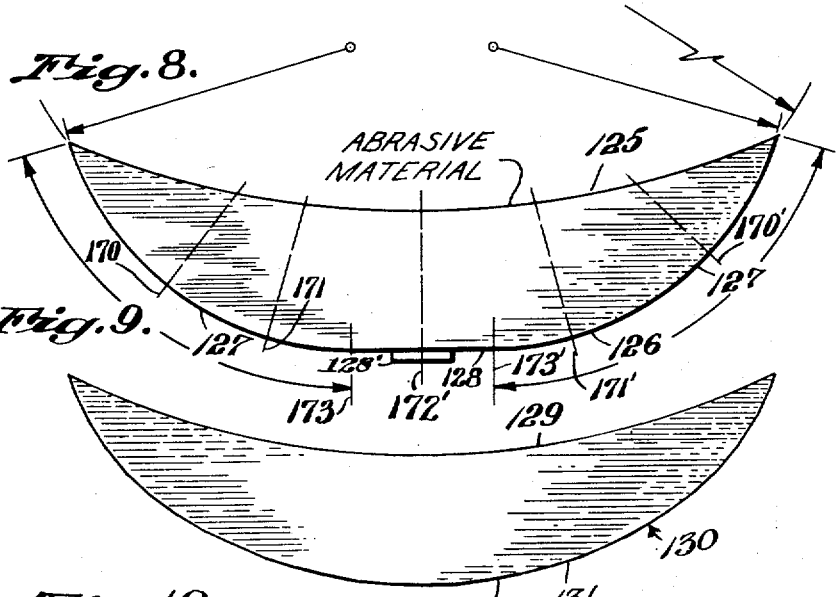
Figure 9:
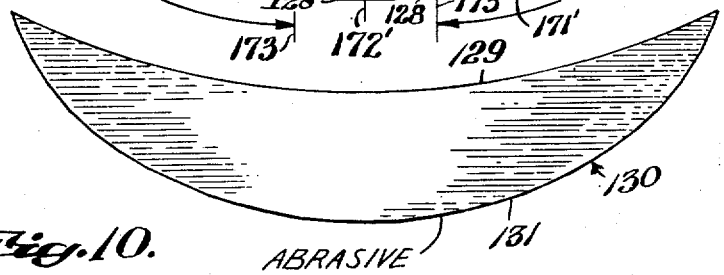

In Figure 8 I have shown an inner surface formed from a single arc 125, while the outer surface 126 is formed arcuate having arcs 127 at either end joined by a flat portion 128 which may be raised as at 128′ to provide a land to fit the contour of the holder for mounting the segment, which land may be an alternate form to that shown in my Patent 2,476,334 in Figure 5 at 31. In Figure 9 I have shown the inner surface 129 formed from an arc of a single radius, while the outer surface 130 is formed from a plurality of flat surfaces 131 each in an obtuse angle to each other but generally conforming to the shape defined in Figure 6. In Figure 10 the same general arrangement, as shown in Figure 9, is provided, there being an arc of uniform radius 132, while the outer surface 133 is formed from a plurality of flat surfaces 134 longer than the flat surfaces 131 and each at an obtuse angle to the next one but all generally conforming to the shape of the arcuate surface 116 of Figure 6.

Modifications of the outer surface of the segment are shown as in Figure 11, there being a curved middle portion 135 joined by three flat surfaces 136, 137, and 138 to form the end portion of the block, while in Figure 12 the outer surface is composed of an arc 139 joined by a single flat surface 140 at either end of the block to connect with the inner surface of the block.

Figure 13:
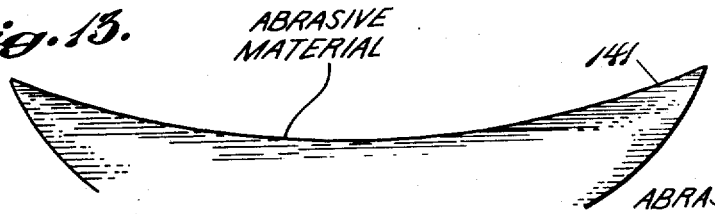
Figure 14:
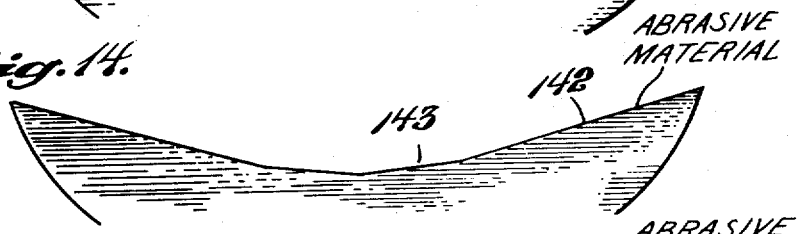

The inner surface of the block may also be formed arcuate in several different forms and these are shown in Figures 13, 14, 15, and 16. In Figure 13 the inner surface is formed from a plurality of short flats 141 each at an obtuse angle to each other, while in Figure 14 there are longer flat surfaces 142 connected by shorter flat surfaces 143 each at an obtuse angle. In Figure 15 three flat surfaces are provided, there being a middle flat surface 144 and end flat surfaces 145, while in Figure 16 two flat surfaces 146 are provided meeting at the center 147.

The above blocks all provide practical schemes of forming blocks which may be disposed in the circular relation which is shown in the wheel of Figure 2, it being merely necessary to utilize one of these many forms for many wheels of different diameter which may be desired. The holders for the blocks or clamps will, of course, be uniform and of a shape to cooperate with the particular shape of block desired. From a strength characteristic standpoint it is desirable to have the ends of thicker or heavier section in order that they may be stronger and the form which I have shown in Figures 1, 2, and 5 is found to be the more suitable in this regard rather than the more fragile section of Figure 7. The many forms illustrated, however, indicate the variations which may be adopted and combinations of which come within the purview of this invention.

In Figure 17 I have shown a block 95 which is substantially one-half of the block shown in Figure 1, which in some cases it may be desirable to use. It will be noted here that the outer surface of this figure, as on all of my segments, is of longer extent than the inner surface: X—Z is longer than X—Y. It will also be noted that the median 96 is non-angular.

In Figure 18 I have shown a block, both the inner and other surfaces 163 and 164 of which are made up of a series of plane surfaces set at obtuse angles forming angularly arcuate sides. The median 165 reflects this angularly arcuate condition in that it is also angularly arcuate.

In summary, I declare that when made in its most efficient design there are, among others, three particularly notable, novel and useful features of my segment as I have had it generally manufactured and a fourth which may be introduced by variations of it.

The first is the function of the important full sharp point of the segment spreading at it does the chips and debris maintaining clean the cutting surface while with a more rounded end, the more is the tendency experienced in actual practice toward undesirable smudging and loading of the cutting surface of the segment following directly, and spreading in a path from any such rounded end.

The second is the important compound curve of the outer front surface of the segment, spreading outwardly as it does the chips and bringing into play the action of centrifugal force in such clearing action. The compound curves, forming stubbier, stronger, safer ends, bring closer the extremities of the segment without unduly extending the width thereof as would exist if a single arc were used for the whole outer surface and thus better permitting a proper close arrangement or placement of the segments in the completed wheel.

The third is the important flat land leading from the full sharp end providing a sufficiently large enough surface area to properly accept the wedge action of the specially designed clamp body of the chuck, properly distributing the stress and strain over a sufficiently large area of the comparatively fragile segment to assure proper strength and safety.

The fourth brings into play the advantages of variations of this segment when made with an angular median. The varying grinding areas that may be used with the segment as Figure 5–*c* and 5–*d*, decreasing or increasing said grinding area respectively, to fit a given requirement yet said segments fitting without change in the same clamp bodies and chuck, introduce a new, novel, and useful grinding surface control not heretofore experienced in this field of grinding without replacing the chuck.

1. For purposes of clarity the following more detailed explanation is given.

(*a*) In a block or segment as herein described, which is symmetrical about a mid point on the median between its sharp ends, the point of widest divergence between the inner and outer arcuate surfaces is that position mid way between its substantially sharp ends, as at 172, in Figures 5, 6 and 17.

(*b*) However, in a block wherein the center portion of the outer arcuate surface comprises a substantially flat surface joining the two end arcuate surfaces, the point of widest divergence will come at the inner end of such arcs where they connect with said flat surface as at 173 and 173′ in Figure 8.

The following designations are given to sections of the block or segment in this disclosure, regarding such full length segment divided into six sections of substantially equal length along its median between its sharp ends or corresponding sections in a segment of substantially one-half portion divided into three sections of substantially equal length along its median between its sharp end and its point of widest divergence between its inner and outer arcuate surfaces. This is indicated by the lines 170, 171, and 172 in Figures 5, 6, 8 and 17.

2. The "tip end sections" are those sections outside of 170 and 170′ at the sharp ends.

3. The "mid end sections" are those sections between 170 and 171 or between 170' and 171', between the center sections and the tip end sections.

4. The "center sections" are those sections between 171 and 172 also between 171' and 172.

5. The "center portion" includes the two center sections between 171 and 171'.

6. The "leading portion" and "'trailing portion" is that portion at either end of a segment outside of 171 and 171' including a tip end section and a mid end section.

7. The "mid areas" are those sections between 170 and 170' including the "mid end" and "center sections" but excluding "tip end sections."

All "full sharp" ends are "sharp" ends but not all "sharp" ends are "full sharp" ends.

8. To clarify specifically concerning the fundamental design of my segment, attention is respectfully called to Fig. 3, showing a block of symmetrical form with a straight median. This shows the basic design of a block which if actuated along the direction of its straight median would inherently possess a functional and rather ideal plowlike characteristic. However, as grinding of this sort is done by rotation about a center, rather than in a straight line, it better suits my application of such block to select an arcuate median of convenient length and curvature, and reconstruct about this arcuate median the corresponding functional form with rather ideal plowlike characteristics and thus evolve my basic usable original design shown in Fig. 4.

Attention is further called to the fact that whereas the inner and outer arcuate surfaces outlined on Fig. 4 are determined directly from measurements between said surfaces and the median at positions corresponding on Fig. 3, the resulting outer arcuate surface on Fig. 4 may best be reproduced commercially from Fig. 4 for use in Fig. 5 and others by determining the radius of the center portion of said outer arcuate surface and establishing that as the center arc, and at either end determining the radii of the merging arcs of shorter radius, also locating the relative positions of the centers of each. It will further be found that the merging of the center arc with an arc of shorter radius occurs at a point along said outer surface between the position of widest divergence of said arcuate surfaces and a position along said outer surface two-thirds of the distance toward the sharp end. Thus the outer arcuate surfaces of Figs. 4 and 5 are identical in that the outer arcuate surface of Fig. 5 has, by this method, been taken from Fig. 4.

I claim:

1. A bonded abrasive block shaped as a pseudo hollow cylindrical segment, formed between an inner arcuate surface of shorter and an outer arcuate surface of longer extent, said arcuate surfaces being perpendicular to an end surface and substantially equidistant throughout their course from a nonangular median, said inner and outer arcuate surfaces at their intersection meeting the nonangular median in an acutely angled substantially sharp end and wherein said outer arcuate surface is comprised of an arc extending from the formation of said sharp end to a point along said outer surface between the position of widest divergence of said arcuate surfaces and a position along said outer surface substantially two-thirds of the distance to said sharp end, and at such point merging into a flatter surface.

2. A bonded abrasive block as in claim 1 wherein said inner surface comprises an arc merging into a flat plane carried to said median.

3. A bonded abrasive block as in claim 1 wherein said outer surface comprises an arc extending from the formation of said sharp end to the point of widest divergence of the outer arcuate surface from the inner arcuate surface, there merging into a flat surface.

4. A bonded abrasive block as in claim 1 wherein said inner surface is modified at its acutely angled end through a merging of the interior arcuate surface into an arcuate surface of reverse direction carried to said median at said substantially sharp end.

5. A bonded abrasive block as in claim 1 wherein the block has opposite ends that are symmetrical with reference to the mid-point on the median.

6. A bonded abrasive block shaped as a pseudo hollow cylindrical segment comprising leading end, center portion and trailing end, said center portion being formed between inner and outer generally arcuate surfaces, both perpendicular to an end surface and each respective leading and trailing end being similar and formed by converging continuations of the inner and outer arcuate surfaces of said center portion into substantially sharp ends and wherein said outer arcuate surface is comprised of arcs extending inwardly from the formations of said sharp ends to positions along said outer arcuate surface bordering the mid areas which consist of the center portion and substantially one-half of the leading and trailing portions adjacent thereto along said outer surface where they merge into a flatter joining surface.

7. A bonded abrasive block as in claim 6 wherein the ends of said inner arcuate surface of said center portion join flat planes on said leading and trailing portions.

8. A bonded abrasive block as in claim 6 wherein said inner arcuate surface is modified at its acutely angled sharp end through a merging of the interior arcuate surface into arcuate surface of reverse direction carried to said end.

9. A bonded abrasive block as in claim 6 wherein said outer surface is comprised of arcs extending inwardly from the formation of said sharp ends to positions of widest divergence of said inner and outer arcuate surfaces where they connect with a substantially flatter joining surface.

10. A bonded abrasive block as in claim 1 wherein said inner surface comprises an arcuate surface merging into a flat plane carried to the arcuate median and having opposite ends and wherein said opposite ends are similar.

11. A bonded abrasive block as in claim 1 wherein said outer surface comprises a mid arc merging into an arc of shorter radius intersecting said median and having opposite ends and wherein said opposite ends are similar.

12. A bonded abrasive block as in claim 1 wherein said inner surface comprises an arcuate surface merging into a flat plane, carried to the arcuate median and wherein said outer surface comprises a mid arc merging into an arc of shorter radius, intersecting said median.

13. A bonded abrasive block as in claim 1 wherein said inner surface comprises an arcuate surface merging into a flat plane, carried to the arcuate median and wherein said outer surface comprises a mid arc merging into an arc of shorter radius, intersecting said median, and having opposite ends and wherein said opposite ends are similar.

14. A bonded abrasive block shaped as a pseudo hollow cylindrical segment, of symmetrical form with reference to the mid point on the median formed between an inner arcuate surface of shorter, and an outer arcuate surface of longer extent, said arcuate surfaces being perpendicular to an end surface and substantially equidistant throughout their course from an arcuate median, said inner and outer arcuate surfaces meeting at either end of said median in acutely angled substantially sharp ends and wherein said outer arcuate surface is comprised of arcs extending inwardly from the formations of said sharp ends to positions along said outer arcuate surface bordering the mid areas located between the mid point on said outer surface between said ends and points substantially two-thirds of the distance along said outer surface to said sharp ends, and at such points merging with a connecting arc of greater radius.

15. A bonded abrasive block as in claim 6 wherein said inner arcuate surface merges into flat planes carried to said ends and wherein said outer surface comprises a mid arc merging into arcs of shorter radius carried to said ends.

16. A bonded abrasive block as in claim 1 wherein said inner surface comprises both an arc and a flat plane merging into each other with the latter carried to said nonangularly arcuate median and terminating in a substantially sharp point by intersection with the outer surface.

17. A bonded abrasive block as in claim 1 wherein said inner and outer arcuate surfaces meet at said median in substantially sharp ends.

18. A bonded abrasive block as in claim 6 wherein said opposite ends are symmetrical with reference to the mid point on an angular median.

19. A bonded abrasive block as in claim 6 wherein said converging continuations of the inner and outer arcuate surfaces of said center portion terminate at the point of intersection of said arcuate surfaces.

20. A bonded abrasive block as in claim 1 wherein said outer surface comprises an arc extending from the formation of said sharp end to a point along the outer surface of the mid area, between said sharp tip end section and the position of widest divergence between said inner and outer arcuate surfaces, where it merges into an arc of greater radius.

21. A bonded abrasive block as in claim 6 wherein said outer arcuate surface is comprised of arcs extending inwardly from the formation of said sharp ends to positions bordering the mid areas between the sharp tip end sections and the center point on the outer surface where there exists the widest divergence between said inner and outer arcuate surfaces, where they merge into a connecting arc of greater radius.

22. A bonded abrasive block as in claim 1 wherein the end of the block is full sharp.

23. A bonded abrasive block as in claim 6 wherein one end of the block is full sharp.

ALBERT SHEPARD TITCOMB.

References Cited in the file of this patent or the original patent

UNITED STATES PATENTS

| Number | Name | Date |
|---|---|---|
| 797,427 | Harris | Aug. 15, 1905 |
| 848,760 | Mills | Apr. 2, 1907 |
| 863,172 | Harrison | Aug. 13, 1907 |
| 1,027,536 | Gardner | May 28, 1912 |
| 1,767,321 | Skillings | June 24, 1930 |
| 1,868,492 | Buckeister | July 26, 1932 |
| 2,082,404 | Leshure | June 1, 1937 |
| 2,235,446 | Birger et al. | Mar. 18, 1941 |
| 2,307,632 | Meyer | Jan. 5, 1943 |

FOREIGN PATENTS

| Number | Country | Date |
|---|---|---|
| 52,589 | Switzerland | July 15, 1910 |